US007756337B2

(12) United States Patent
Chen et al.

(10) Patent No.: US 7,756,337 B2
(45) Date of Patent: Jul. 13, 2010

(54) METHOD AND APPARATUS FOR REDUCING REFERENCE CHARACTER DICTIONARY COMPARISONS DURING HANDWRITING RECOGNITION

(75) Inventors: Yen-Fu Chen, Austin, TX (US); John W. Dunsmoir, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1733 days.

(21) Appl. No.: 10/756,919

(22) Filed: Jan. 14, 2004

(65) Prior Publication Data

US 2005/0152601 A1 Jul. 14, 2005

(51) Int. Cl.
G06K 9/00 (2006.01)
G06K 9/18 (2006.01)
G06K 9/46 (2006.01)
(52) U.S. Cl. .................. 382/187; 382/185; 382/202
(58) Field of Classification Search ............. 382/202, 382/185, 187
See application file for complete search history.

(56) References Cited

U.S. PATENT DOCUMENTS

| 4,897,638 | A | 1/1990 | Kokunishi et al. | 345/472 |
|---|---|---|---|---|
| 5,329,625 | A | 7/1994 | Kannan et al. | 345/173 |
| 5,911,005 | A | 6/1999 | Uchiyama | 382/187 |
| 6,023,529 | A | 2/2000 | Ilan et al. | 382/186 |
| 6,226,403 | B1* | 5/2001 | Parthasarathy | 382/187 |
| 6,535,619 | B1 | 3/2003 | Suwa et al. | 382/101 |
| 6,694,056 | B1* | 2/2004 | Ito et al. | 382/186 |
| 7,013,046 | B2 | 3/2006 | Kawamura et al. | 382/187 |
| 2002/0067854 | A1* | 6/2002 | Reintjes et al. | 382/199 |
| 2002/0168107 | A1* | 11/2002 | Tang et al. | 382/187 |
| 2003/0099398 | A1* | 5/2003 | Izumi | 382/186 |
| 2003/0107558 | A1 | 6/2003 | Bryborn et al. | 345/179 |

FOREIGN PATENT DOCUMENTS

| CN | 1302010 A | 7/2001 |
|---|---|---|
| JP | 55138172 | 10/1980 |
| JP | 57121770 | 7/1982 |
| JP | 59144983 | 8/1984 |
| JP | 61-190684 | 8/1986 |
| JP | 63208183 | 8/1988 |
| JP | 02110796 | 4/1990 |
| JP | 06295356 | 10/1994 |
| JP | 07311817 | 11/1995 |

(Continued)

OTHER PUBLICATIONS

Japanese foreign search dated Jul. 14, 2009.

*Primary Examiner*—Samir A Ahmed
*Assistant Examiner*—Amara Abdi
(74) *Attorney, Agent, or Firm*—Yee & Associates, P.C.; William H. Steinberg

(57) ABSTRACT

A method, computer program product, and a data processing system for performing handwriting recognition of a language having character stroke order rules. A stroke parameter set describing attributes of a handwritten stroke is calculated, and a user input indicates a stroke order knowledge. A reference character dictionary includes a record having a plurality of reference parameter sets each defining attributes of reference character strokes. A stroke sequence number of the stroke parameter set is identified and at least one of the reference parameter sets are excluded from a comparison with the stroke parameter set based on the stroke sequence number.

8 Claims, 7 Drawing Sheets

FOREIGN PATENT DOCUMENTS

| | | |
|---|---|---|
| JP | 08249424 | 9/1996 |
| JP | 10007930 A | 1/1998 |
| JP | 10-171589 | 6/1998 |
| JP | 2001236466 | 8/2001 |
| JP | 2002259908 A | 9/2002 |

* cited by examiner

| | CHARACTER NO | CHARACTER | STROKES | REFERENCE PARAMETER Set1 | REFERENCE PARAMETER Set2 | REFERENCE PARAMETER Set3 | REFERENCE PARAMETER Set4 | REFERENCE PARAMETER Set5 | AUDIO |
|---|---|---|---|---|---|---|---|---|---|
| 720 | 0 | 一 | 1 | L1,θ1,C1 | NULL | NULL | NULL | NULL | Char0.MP3 |
| 721 | 1 | ト | 2 | L2,θ2,C2 | L3,θ3,C3 | NULL | NULL | NULL | Char1.MP3 |
| 722 | 2 | T | 2 | L4,θ4,C4 | L5,θ5,C5 | NULL | NULL | NULL | Char2.MP3 |
| 723 | 3 | 干 | 3 | L6,θ6,C6 | L7,θ7,C7 | L8,θ8,C8 | NULL | NULL | Char3.MP3 |
| 724 | 4 | 土 | 3 | L9,θ9,C9 | L10,θ10,C10 | L11,θ11,C11 | NULL | NULL | Char4.MP3 |
| 725 | 5 | 中 | 5 | L12,θ12,C12 | L13,θ13,C13 | L14,θ14,C14 | L15,θ15,C15 | L16,θ16,C16 | Char5.MP3 |

*FIG. 9*

METHOD AND APPARATUS FOR REDUCING REFERENCE CHARACTER DICTIONARY COMPARISONS DURING HANDWRITING RECOGNITION

RELATED APPLICATIONS

The present application is related to commonly assigned and U.S. patent application Ser. No. 10/756,918 entitled "METHOD AND APPARATUS FOR PERFORMING HANDWRITING RECOGNITION BY ANALYSIS OF STROKE START AND END POINTS", filed on Jan. 14, 2004, and to commonly assigned and U.S. patent application Ser. No. 10/756,930 entitled "METHOD AND APPARATUS FOR SCALING HANDWRITTEN CHARACTER INPUT FOR HANDWRITING RECOGNITION" and hereby incorporated by reference.

BACKGROUND OF THE INVENTION

1. Technical Field

The present invention relates generally to an improved data processing system and in particular to a method and apparatus for performing handwriting recognition. Still more particularly, the present invention provides a method and apparatus for reducing the number of comparisons made with a reference character dictionary when performing handwriting recognition.

2. Description of Related Art

In the field of handwriting recognition, various approaches have been taken by software vendors to provide more accurate recognition of handwriting samples. Written languages that have large character sets, e.g., the Chinese and Korean languages, are particularly problematic for software vendors to develop efficient handwriting recognition algorithms. The Chinese language, for example, includes thousands of characters. Accordingly, a reference character dictionary for performing handwriting recognition of the Chinese language necessarily includes thousands of entries. The data size of the characters maintained in the reference dictionary limits the efficiency for performing handwriting analysis of written Chinese characters.

Handwriting recognition solutions require sampling handwritten character strokes during input of the strokes and comparing the samples with reference characters maintained in a reference character dictionary. For example, many handwriting recognition algorithms require construction of an image, such as a bitmap, of the handwritten character for interrogation of a reference character dictionary. For languages including large character sets, thousands of comparisons may be made to identify a potential match. Such techniques are data-intensive and require large processing capacity to effectively implement a handwriting recognition algorithm.

Many languages have rules that define the order in which character strokes are to be written. For example, well established rules dictate the order in which the strokes of Chinese characters are written.

It is desirable to provide a handwriting recognition technique that exploits stroke order rules for reducing the number of comparisons made with a reference character dictionary when performing handwriting recognition. It would be advantageous to enable a user to indicate a knowledge of the stroke order of a language in which the user supplies handwritten characters for analysis by a handwriting recognition algorithm. It would be further advantageous for the handwriting recognition algorithm to exclude attributes of a reference character stroke from comparison with a handwritten stroke, or parameters derived therefrom, when the handwritten stroke is input in a stroke sequence that does not correspond to the reference character stroke sequence. It would still be further advantageous to enable a user to provide an input that indicates a variable knowledge level of the stroke order and for the handwriting recognition algorithm to reduce the number of comparisons made with entries of the reference character dictionary an amount that is dependent on the user input.

SUMMARY OF THE INVENTION

The present invention provides a method, computer program product, and a data processing system for performing handwriting recognition of a language having character stroke order rules. A stroke parameter set describing attributes of a handwritten stroke is calculated, and a user input indicates a stroke order knowledge. A reference character dictionary includes a record having a plurality of reference parameter sets each defining attributes of reference character strokes. A stroke sequence number of the stroke parameter set is identified and at least one of the reference parameter sets are excluded from a comparison with the stroke parameter set based on the stroke sequence number.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is a diagrammatic illustration of reference character dictionary records used for identifying candidate characters in accordance with a preferred embodiment of the present invention;

DETAILED DESCRIPTION OF THE PREFERRED EMBODIMENT

Figure 1:
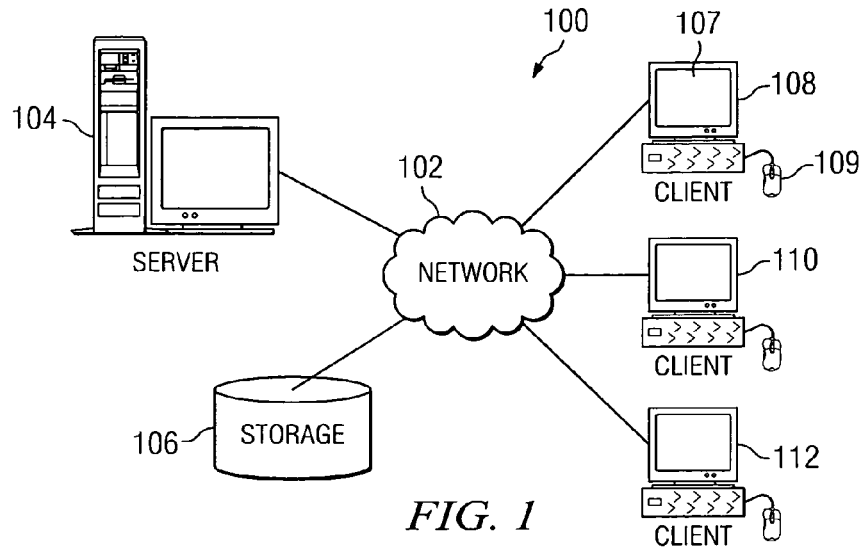
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, a personal computer or network computer. In the depicted example, server 104 provides data, such as HTML documents and attached scripts, applets, or other applications to clients 108, 110, and 112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, including thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention. Server 104 as illustrated is a web server, also referred to as a HTTP server, and includes server software that uses HTTP to serve up HTML documents and any associated files and scripts when requested by a client, such as a web browser. The connection between client and server is usually broken after the requested document or file has been served. HTTP servers are used on Web and Intranet sites.

Figure 2:
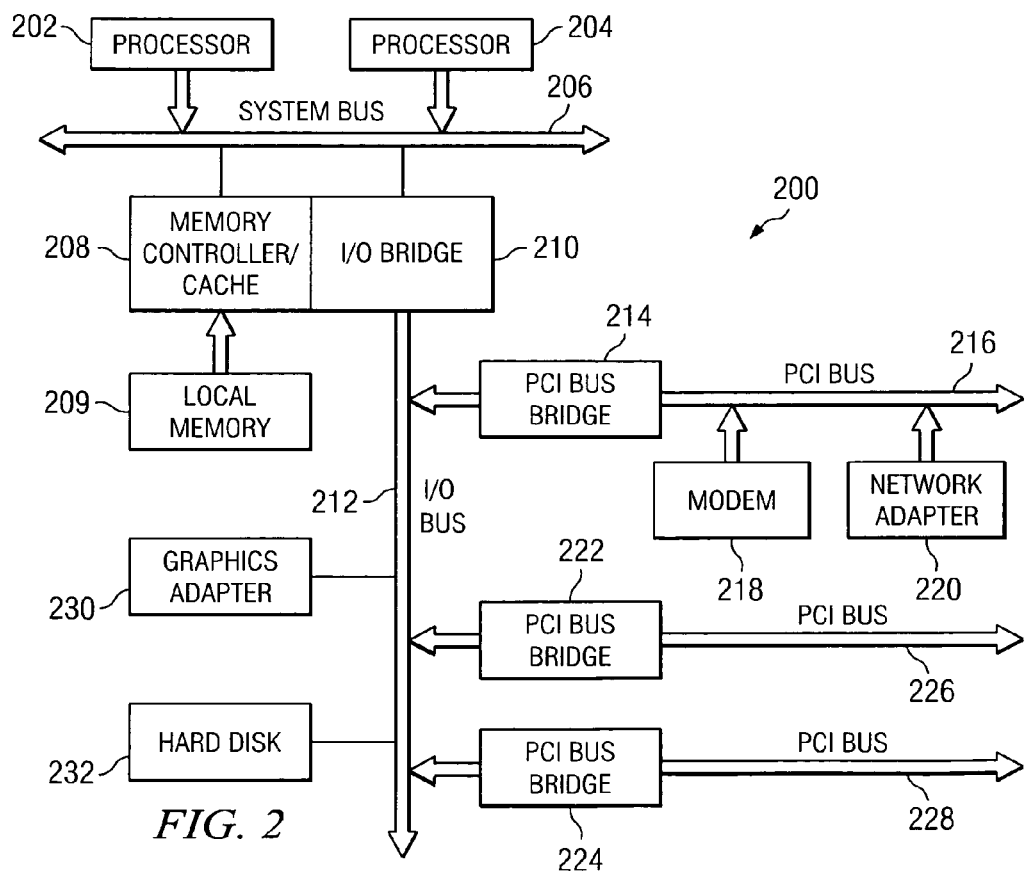
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 is an example of a computer that may be used to analyze parameters calculated from handwritten character strokes obtained from one or more of clients 108, 110, and 112. More specifically, data processing system 200 supplies data that is processed by a client for providing a computer interface on a display device by which a user of the client provides handwritten character input through the use of a pointing device. In the illustrative examples, an application provided to the client by data processing system 200 derives parameters from character strokes input by the user and communicates the parameters to data processing system 200. Responsive to receipt of the parameters, data processing system 200 identifies one or more candidate characters and communicates the candidate characters to the client.

Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. System 200 runs a handwriting recognition algorithm in accordance with an embodiment of the invention as described more fully below.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
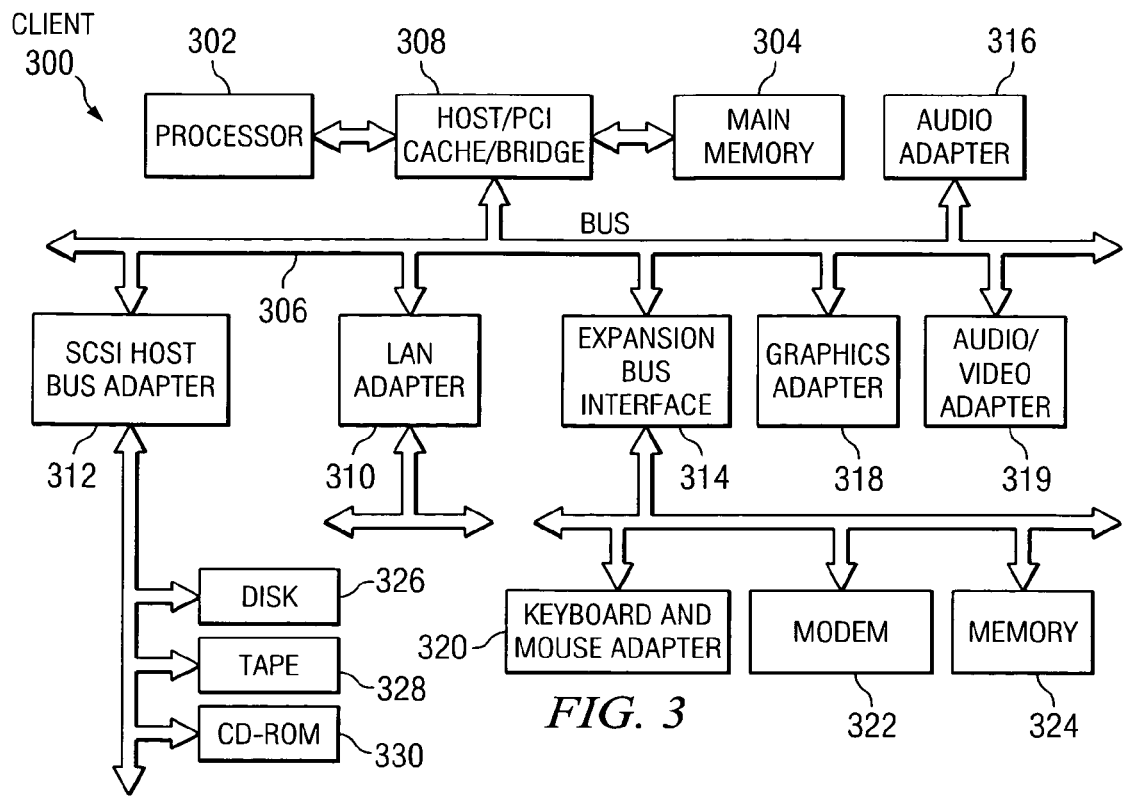
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer, such as client 108 in FIG. 1, which may be used for receiving a handwritten character from a user and for calculating stroke parameters of the handwritten character. More particularly, data processing system 300 receives a web page download from system 200 and, responsive to processing of the web page download, displays a computer interface for input of handwritten characters. Each character stroke of a handwritten character is evaluated for stroke start and end events. Data processing system 300 calculates one or more stroke parameters upon determination of the stroke start and end events. A stroke parameter defines an attribute of the stroke input by the user. For example, a length parameter may be determined that provides a numerical measure of the length of a stroke input by the user. An angle parameter may be determined that provides a numerical measure of the trajectory at which the stroke was input. A center parameter may be determined that identifies a position or coordinate of a center point of the stroke. Responsive to calculation of the stroke parameters, data processing system 300 communicates the stroke parameters to data processing system 200 for submission to the handwriting recognition algorithm executed by system 200. A candidate character identified by system 200 is communicated to data processing system 300 and the user is able to confirm a match between the character being supplied to the client computer interface and the candidate character identified by system 200. Additional stroke parameters are calculated as the user continues supplying character strokes to the client computer interface and are communicated to system 200 for further handwriting analysis until a candidate character is confirmed as a match by the user of data processing system 300.

Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Graphics adapter 318 drives a display device 107 that provides the computer interface, or GUI, for displaying handwritten characters as supplied by the user. Expansion bus interface 314 provides a connection for a keyboard and mouse adapter 320, modem 322, and additional memory 324. A pointing device such as mouse 109 is connected with adapter 320 and enables supply of pointer input to system 300 by a user. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

The term "mouse", when utilized in this document, refers to any type of operating system supported graphical pointing device including, but not limited to, a mouse, track ball, light pen, stylus and touch screen or touch pad, and the like. A pointing device is typically employed by a user of a data processing system to interact with the data processing system's GUI. A "pointer" is an iconic image controlled by a mouse or other such devices, and is displayed on the video display device of a data processing system to visually indicate to the user icons, menus, or the like that may be selected or manipulated.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Data processing system 300 runs a web browser adapted to execute a character stroke collection algorithm in accordance with an embodiment of the invention. Preferably, the stroke collection algorithm is distributed to system 300 as a Java applet when the browser downloads a document, e.g., an HTML-encoded web page, from system 200. Accordingly, the browser executed by data processing system 300 may be implemented as any one of various well known Java enabled web browsers such as Microsoft Explorer, Netscape Navigator, or the like.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
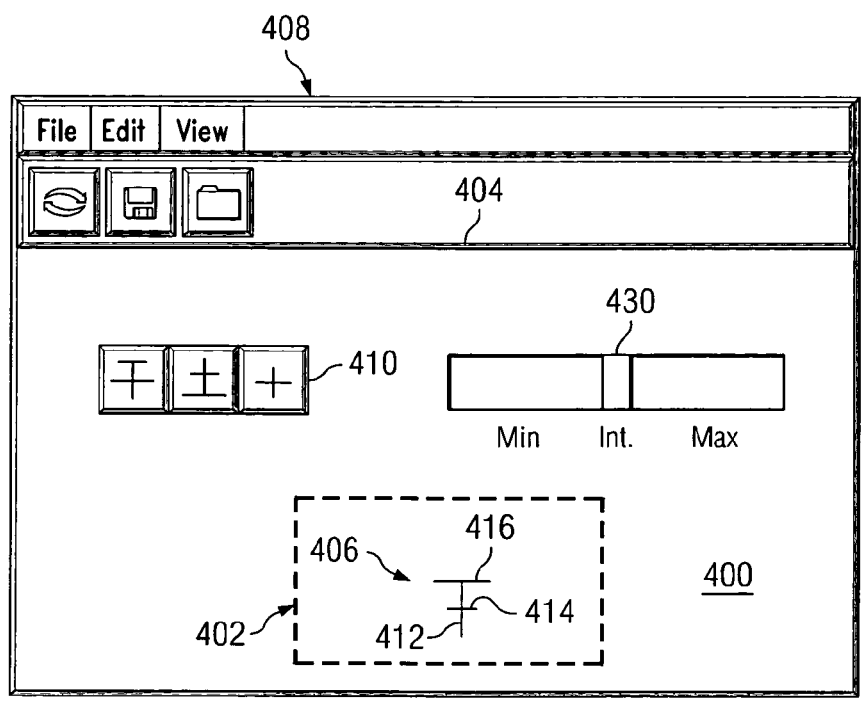
FIG. 4 is a diagram of a computer interface for accepting handwritten character input and displaying candidate characters in accordance with a preferred embodiment of the present invention.

FIG. 4 is a depiction of a GUI 400 output on display device 107 when a client connects with server 104 in accordance with a preferred embodiment of the present invention. GUI 400 is displayed responsive to the client processing a web page communicated from server 104. GUI 400 is preferably displayed in window 404 of a web browser interface 408. As illustrated in FIG. 4, GUI 400 includes capture area 402 for display of handwritten characters supplied to the client and candidate characters identified and communicated to data processing system 300 by data processing system 200 according to embodiments of the invention. The user supplies handwritten characters to capture area 402 via a pointing device such as mouse 109. Additionally, GUI 400 includes candidate character display 410 for display of the most recently determined candidate characters and for receiving confirmation of a candidate character match by the user.

In the illustrative example, a complete Chinese character 406 is shown entered into capture area 402. Input of character 406 requires a number of hand strokes. The particular character shown requires input of three strokes 412, 414, and 416. The stroke collection algorithm executed by the client detects the beginning and end of each character stroke supplied to capture area 402. Upon detection of a completed stroke, stroke parameters are calculated from the detected stroke. The stroke parameters are communicated to data processing system 200 for identification of one or more candidate characters that may match the user input as described more fully below.

Figure 5:
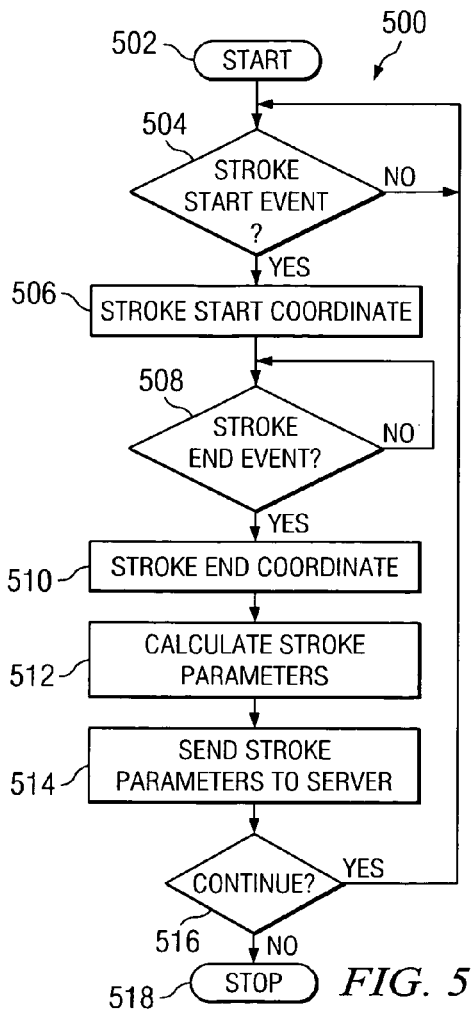
FIG. 5 is a flowchart of the processing performed by a client for collecting handwritten character strokes according to a preferred embodiment of the present invention.

FIG. 5 is a flowchart of the processing performed by the stroke collection algorithm executed by the client according to a preferred embodiment of the invention. The stroke collection algorithm is initiated (step 502) and proceeds to poll for a stroke start event (step 504). In the depicted example, a stroke start event is a pointing device "down" event, such as depression of a mouse button. Upon detection of a stroke start event, the stroke collection algorithm temporarily records a coordinate of the stroke start event (step 506) and proceeds to poll for a stroke end event (step 508). In the illustrative examples, a stroke end event is a pointing device "up" event such as release of a mouse button.

Upon detection of the stroke end event, a coordinate of the stroke end event is read (step 510) and stroke parameters are calculated (step 512). The stroke parameters are communicated to data processing system 200 for analysis by the handwriting recognition algorithm (step 514). An evaluation of whether to continue is made (step 516), and the routine returns to polling for a stroke start event. Otherwise, the routine exits (step 518).

Figure 6:
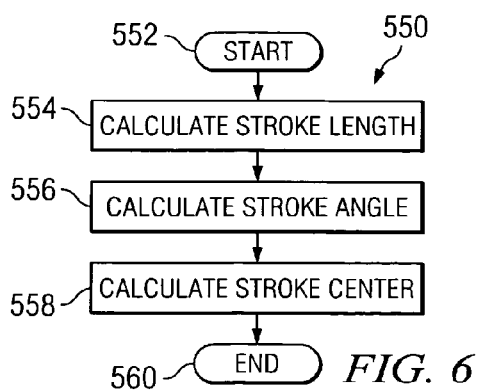
FIG. 6 is a flowchart of stroke parameter calculations performed by the client in accordance with a preferred embodiment of the present invention.

FIG. 6 is a flowchart 500 of processing performed by the stroke collection algorithm in accordance with an embodiment of the invention. The processing steps shown and described in FIG. 6 correspond to step 512 of FIG. 5. Calculation of the stroke parameters is initiated upon detection of a stroke start event and subsequent stroke end event (step 552). A stroke length parameter is calculated from stroke start and end point coordinates (step 554). For example, pointer icon coordinates corresponding to the stroke start and end events may be algebraically processed to determine a linear "length" measure between the stroke start and end points. Additionally, a stroke angle parameter is calculated through, for example, trigonometric relations of the stroke start and end coordinates and provides a directional measure of the stroke (step 556). A stroke center parameter is preferably calculated (step 558) and may be derived from the stroke length and angle parameters and one of the stroke start and end event coordinates. Upon calculation of the stroke parameters, the stroke parameter calculation algorithm exits (step 560).

Figure 7:
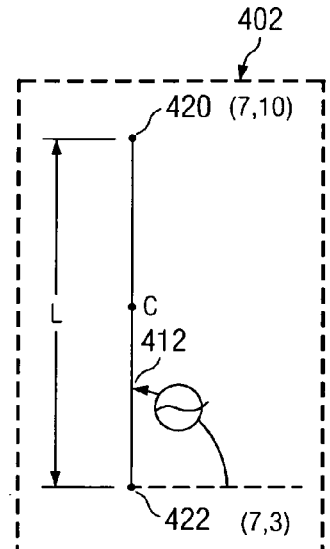
FIG. 7 is a diagram illustrating calculation of stroke parameters by the client according to a preferred embodiment of the present invention.

FIG. 7 is a diagram illustrating calculation of stroke parameters by the stroke collection algorithm according to a preferred embodiment of the invention. A stroke start event is detected in response to a suitable command provided to a pointing device such as mouse 109. For example, a stroke start event may be detected in response to a mouse "down" event, or initiation of a mouse drag operation by depression of a mouse 109 button, while the mouse pointer is located within collection area 402. Alternatively, a stroke start event may be determined in response to a stylus down event detected on a touch pad if handwritten characters are provided to a touch pad. A start point 420 of stroke 412 is identified and corresponds to the mouse position when the stroke start event is detected. Alternatively, start point 420 corresponds to a stylus position on a touch pad when the stroke start event is detected. As mouse 109 is moved, stroke 412 is displayed within capture area 402 according to the movement of the mouse supplied by the user. A stroke end event is detected in response to a suitable command provided to mouse 109 such as a mouse "up" or button release event. Alternatively, the stroke end event may be detected in response to a stylus up event detected on a touch pad if handwritten characters are provided to a touch pad. An end point 422 of stroke 412 is identified and corresponds to the mouse or stylus position when the stroke end event is detected.

A coordinate system, e.g., a Cartesian coordinate system, is used for tracking the position of the mouse and associating respective coordinates with start and end points 420 and 422. In the present example, stroke 412 has start point 420 with an x-coordinate of 7 and a y-coordinate of 10. Stroke 412 has end point 422 with an x-coordinate of 7 and a y-coordinate of 3. After the start and end point pair of stroke 412 are detected, one or more stroke parameters are derived from the start and end point coordinates for submission to the handwriting recognition algorithm running on data processing system 200. In accordance with a preferred embodiment of the invention, a stroke length parameter (L), a stroke angle parameter ($\theta$), and a stroke center parameter (C) are calculated from the start and end point coordinates. For example, the stroke length may be calculated by algebraic manipulation of the start and end point coordinates. The stroke angle parameter is derived from the start and end point coordinates, for example by a computer-implemented trigonometric relation between the coordinates of stroke start and end points 420 and 422.

Additionally, the stroke center parameter is calculated by a computer-implemented trigonometric computation using one of the start and end point coordinates, the stroke length parameter and the stroke angle parameter as operands. The stroke center parameter is a coordinate of a calculated center point of stroke 412. In the preferred embodiment, the stroke parameters are calculated by approximating the stroke as a linear motion. Accordingly, all stroke parameters may be derived using only the stroke start and end point coordinates. The stroke parameters, collectively referred to herein as a stroke parameter set, calculated from the stroke coordinates are transmitted to data processing system 200 by way of network 102.

Notably, the stroke collection algorithm running on client system 300 does not wait until character completion by the user before attempting to identify the character being input by the user. Accordingly, communication of a stroke parameter set derived from one stroke input may be made to data processing system 200 concurrently with supply of a subsequent stroke by the user. Preferably the stroke collection algorithm described with reference to FIGS. 5-7 is implemented as a Java applet that is downloaded as a Web page attachment when data processing system 200 connects with data processing system 300.

Figure 8:
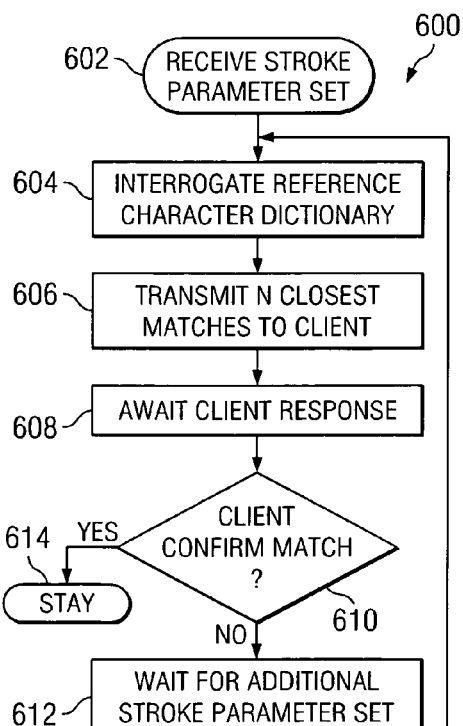
FIG. 8 is a flowchart of processing performed by a handwriting recognition algorithm executed by a server according to a preferred embodiment of the present invention.

FIG. 8 is a flowchart 600 of processing performed by the handwriting recognition algorithm executed by data processing system 200 according to a preferred embodiment of the invention. The handwriting recognition algorithm is initiated upon receipt of a stroke parameter set from the client system (step 602). A reference character dictionary look-up is performed responsive to receipt of the stroke parameter set (step 604). The reference character dictionary may be, for example, implemented as a table, file system, or another suitable data structure. In general, the reference character dictionary comprises attributes of each character of the dictionary that are able to be matched with stroke parameters calculated from the user supplied handwritten character strokes.

More particularly, the reference character dictionary includes attributes of each stroke, such as stroke length, angle, and center parameters. Stroke length, angle, and center parameters of a reference character stroke are collectively referred to herein as a reference parameter set. The reference parameters maintained in the reference character dictionary for a particular reference character entry are compared with a corresponding stroke parameter of the stroke parameter set communicated to the server by the client. A numerical measure, or match probability, of a correspondence between the stroke parameter set and reference parameter sets is generated for one or more of the reference characters defined in the reference character dictionary.

A number N of possible character matches, or candidate characters, are retrieved from the reference character dictionary and are communicated to system 300 (step 606). The number of candidate characters retrieved from the reference character dictionary may be coded into the handwriting recognition algorithm or may be provided by the client.

Alternatively, character entries of the reference character dictionary having respective reference parameters that result in match probabilities in excess of a predefined threshold may be selected as candidate characters for communication to the client. Data processing system 200 awaits a response from the client (step 608). An evaluation of whether the client confirms any of the candidate characters as a match with the character being input is made (step 610).

If the client provides a response that none of the N candidate characters correspond to the handwritten character being input or fails to confirm a candidate character match, handwriting recognition processing proceeds to await for receipt of an additional stroke parameter set (step 612). Another interrogation of the reference character dictionary is performed upon receipt of an additional stroke parameter set.

If the client response confirms one of the N candidate characters as a character match corresponding to the handwritten character, the handwriting recognition processing terminates (step 614). Thus, the reference character dictionary interrogation continues for each stroke of the character supplied by the user until a candidate character obtained by the handwriting recognition algorithm is confirmed as a match by the user. Preferably, the handwriting recognition algorithm illustrated and described with reference to FIG. 8 is implemented as a Java servlet.

FIG. 9 is a diagrammatic illustration of records 720-725 of reference character dictionary 700. Typically, a reference character dictionary of Chinese characters will have thousands of records. The records shown and described are chosen only to facilitate an understanding of the invention. Reference character dictionary 700 is implemented as a table having records 720-725 that respectively include data elements in respective fields 710-718, but other data structures may be suitably substituted. Fields 710-718 typically have a name, or identifier, that facilitates insertion, deletion, querying, and processing of other data operations or manipulations of dictionary 700. In the illustrative example, fields 710, 711, and 712 have respective labels of character number, character, and strokes. Fields 713-717 are labeled reference parameter set1-reference parameter set5, respectively. Field 718 has a label of audio in this example. Reference parameter set fields 714-717 contain reference parameter sets for respective records 720-725.

Each record 720-725 contains a unique index number in key field 710 for distinguishing a particular record from other dictionary 700 entries. Addressing a particular record via an associated key field 710 value is referred to herein as indexing of the record. The character field 711 includes image data of the reference character defined by respective records 720-725. For example, record 723 has an image file, or a reference to an image file such as an address of the image file, in character field 711 that corresponds to the handwritten character supplied to the computer interface described with reference to FIG. 4.

Strokes field 712 contains a data element having a value that specifies the number of constituent character strokes of the reference character defined by respective records 720-725. For example, the character having attributes defined by record 723 consists of a vertical stroke and two horizontal strokes, and strokes field 712 accordingly contains the value of three in record 723. Reference parameter set fields 713-717 include a reference parameter set for each stroke of the character described by respective records 720-725. Reference parameter set fields 713-715 of record 723, for instance, respectively include a reference parameter set of a stroke of the character defined by record 723, and reference parameter set fields 716 and 717 are nulled. Additionally, an audio field 718 may be included in dictionary 700 that contains, or references, an audio file that is an audio recording of a correct pronunciation of the character defined in respective records 720-725.

Upon receipt of a stroke parameter set, system 200 interrogates the reference dictionary. In general, the handwriting recognition algorithm cycles through the entries of dictionary 700 and compares the stroke parameters of the stroke parameter set with corresponding parameters of the reference parameter set. For example, the length parameter of the stroke parameter set is compared with the length parameter of reference parameter sets of the reference character dictionary. Likewise, the angle and center parameters of the stroke parameter set are compared with respective angle and center parameters of reference parameter sets. Match probabilities are generated in response to the comparison of the stroke parameter set with the reference parameter sets. In response to an evaluation of the match probabilities, one or more candidate characters are selected by the server and returned to data processing system 300 for display in candidate character display 410. For example, data processing system 200 may communicate to the client images as identified in character field 711 of the three reference character dictionary entries having the highest match probabilities obtained from the dictionary interrogation. Additionally, audio files of the candidate characters may be communicated to the client with the candidate character images.

Figure 10A:
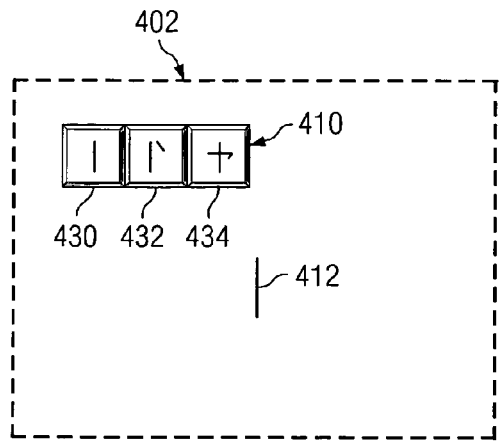
FIG. 10A is a diagram illustrating a capture area and candidate display in a computer interface after user input of a first character stroke in accordance with a preferred embodiment of the present invention.

With reference now to FIG. 10A, a diagrammatic illustration of capture area 402 and candidate display 410 is shown after user input of a first stroke 412 of character 406. A stroke parameter set for stroke 412 is calculated by the client and communicated to data processing system 200 for identification of candidate characters. Data processing system 200 interrogates the reference character dictionary with the stroke parameter set and identifies one or more candidate characters based on a comparison of the stroke parameter set and reference parameter sets of records 720-725. The candidate characters identified by data processing system 200 are communicated to the client for output in candidate display 410. In the illustrative example, three candidate characters 430, 432, and 434 have been identified and are displayed in candidate display 410. If a candidate character identified by system 200 matches the character being input to the client, the user is able to select the correct candidate character in candidate display 410. In the present example, none of the candidate characters identified after input of stroke 412 match character 406 being written by the user.

Figure 10B:
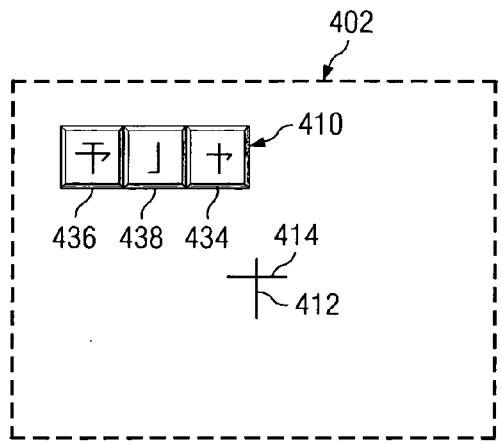
FIG. 10B is a diagram illustrating the capture area and candidate display described in FIG. 10A after user input of a second character stroke in accordance with a preferred embodiment of the present invention.

With reference now to FIG. 10B, a diagrammatic illustration of capture area 402 and candidate display 410 after user input of first and second strokes 412 and 414 of character 406 is shown. A stroke parameter set for stroke 414 is calculated by the client and communicated to system 200 for an additional interrogation of reference character dictionary 700. Data processing system 200 interrogates reference character dictionary 700 with the stroke parameter set calculated by the client from stroke 414 and identifies one or more candidate characters. The candidate characters identified by data processing system 200 are communicated to the client for output in candidate display 410. In the illustrative example, candidate characters 430 and 432 have been eliminated as candidates after the second interrogation of the reference character dictionary and new candidate characters 436 and 438 have been identified and communicated to the client for output in candidate display 410. Candidate character 436 matches the character being supplied to capture area 402. The user confirms that candidate character 436 matches the character being entered by, for example, positioning the pointer within the display area of candidate character 436 and providing an input to the mouse. The client provides a confirmation message to system 200 upon supply of the confirmation input by the user. Preferably, the candidate character selected by the user from candidate display 410 is then displayed in collection area 402 and an audio playback of the selected character may be output by data processing system 200. The user may then begin input of an additional character within capture area 402.

Figure 11A:
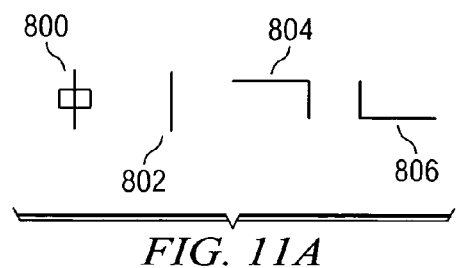
FIG. 11A is a diagram of a character that requires three constituent strokes when properly written.

In accordance with another embodiment of the invention, the stroke collection algorithm may detect directional changes in a single stroke and partition the stroke into multiple logical strokes in accordance with a preferred embodiment of the invention. As referred to herein, a logical stroke refers to a portion, or segment, of a stroke that is partitioned from a single physical stroke and that is analyzed as if the stroke partition is a complete handwritten stroke. FIG. 11A is a Chinese character 800 that when properly written requires three constituent strokes 802, 804, and 806. The right angles of strokes 804 and 806 do not facilitate nominal length, angle and center parameter calculations by analysis of stroke start and end points. For example, a length parameter calculation made according to start and end points of stroke 804 would not provide a desirable estimate of the stroke length. Additionally, users not extensively familiar with the Chinese language may write strokes 804 and 806 as incorrectly including two strokes each. Other users may incorrectly write strokes 804 and 806 together in a single physical stroke.

Figure 11B:
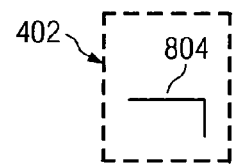
FIG. 11B is a diagram illustrating a stroke of the character described in FIG. 11A as entered into the capture area of the computer interface.

Next, FIG. 11B illustrates stroke 804 entered into capture area 402 as a single physical stroke. In accordance with an embodiment of the invention, a stroke in which the directional motion of the pointing device changes in an amount equal or exceeding a threshold, for example 90 degrees, during input of the stroke is divided into multiple logical strokes.

Figure 11C:
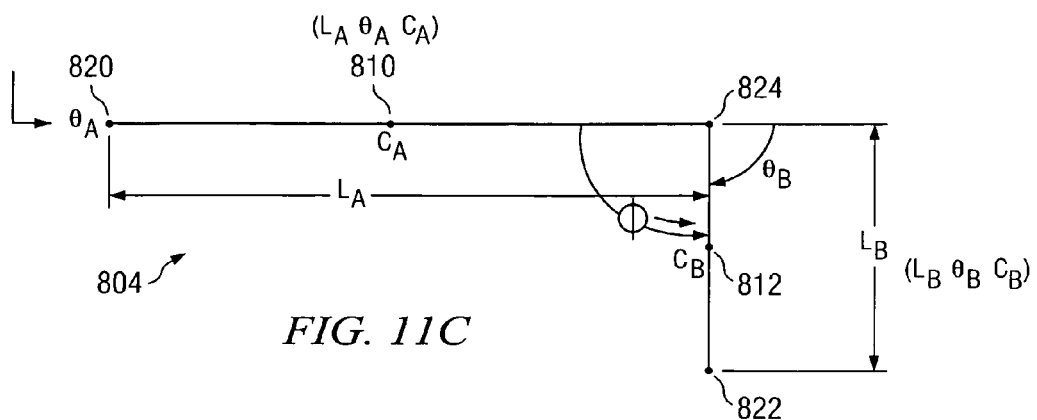
FIG. 11C is a diagram illustrating a partitioning of the stoke described in FIG. 11B in accordance with a preferred embodiment of the present invention.

FIG. 11C illustrates an exemplary partitioning of stoke 804 as implemented according to a preferred embodiment of the invention. Stroke start and end points 820 and 822 are identified and coordinates are obtained for each of the start and end points 820 and 822. Additionally, the stroke collection algorithm detects a change in the stroke trajectory and partitions stroke 804 into multiple logical strokes 810 and 812. In the illustrative example, a trajectory change of $\Phi$ is detected equivalent to a predefined trajectory threshold of 90 degrees. Stroke 804 is partitioned into logical strokes 810 and 812 by the stroke collection algorithm.

Stroke parameters are calculated for each of logical strokes 810 and 812 responsive to detection of a pointer trajectory change equal or exceeding the trajectory threshold. Pursuant to identification of stroke 804 as including logical strokes 810 and 812, a partition point 824 is assigned at a stroke position where the stroke trajectory equals or exceeds the trajectory threshold. The partition point 824 is assigned as an end point to logical stroke 810 and as a stroke start point for logical stroke 812. Accordingly, length (LA), angle ($\Theta A$), and center (CA) parameters are calculated for logical stroke 810 based on stroke start point 820 and partition point 824. Similarly, length (LB), angle ($\Theta B$), and center (CB) parameters are calculated for logical stroke 812 based on partition point 824 assigned as a start point and stroke end point 822 of logical stroke 812. In a similar manner, stroke 806 is partitioned into two logical strokes when entered into collection area 402 by the user.

While the examples of FIGS. 11A-11C illustrate stroke 804 being partitioned into two logical strokes 810 and 812, the partitioning example shown and described is exemplary only. A single physical stroke may be partitioned into any number of logical strokes. The number of logical strokes into which a stroke is partitioned is dependent on the trajectory threshold and changes in the trajectory of a stroke supplied to capture area 402.

Pursuant to enabling partitioning of handwritten character strokes into multiple logical strokes, the reference parameter sets of reference character dictionary 700 may describe attributes of logical strokes when appropriate. For example, record 725 is an exemplary character entry of the reference character dictionary for the character shown in FIG. 11A. Notably, the stroke number maintained in the stroke field is a stroke count that includes logical strokes. The character defined by record 725 and described in FIG. 11A requires three handwritten strokes when properly written. However, the stroke number of record 725 specifies a stroke count of five. The stroke count of stroke field 712 of the reference character dictionary is the sum of the particular reference character strokes that do not require trajectory changes equal or exceeding the trajectory threshold and the number of logical strokes of any physical strokes that require trajectory changes equal or exceeding the trajectory threshold.

Accordingly, character entry 725 has five reference parameter sets—one that describes a physical stroke and four that describe logical strokes. Each stroke, whether physical or logical, includes a corresponding reference parameter set field with a reference stroke parameter set that is compared against stroke parameter sets calculated by the client.

The ability to identify a correct candidate character is enhanced by partitioning character strokes into logical strokes. For example, character 800 properly written as three strokes 802, 804, and 806 is partitioned into a total of five strokes and corresponding stroke parameter sets are calculated for each of the physical and logical strokes. Moreover, character 800 may be written improperly with two strokes or five strokes. In each instance, a total of five strokes are identified by the client and stroke parameter sets for each of the five strokes are calculated. Thus, partitioning strokes of a handwritten character into logical strokes facilities accurate candidate character identification when a character is written properly or improperly.

Many languages including the Chinese language have rules, either formal or by custom, by which characters are to be properly written. For example, well established rules dictate the order in which the strokes of Chinese characters are written. For example, Chinese character strokes typically are written from top to bottom and left to right.

In the absence of any stroke order knowledge by the user, an exhaustive comparison of the stroke parameter set with reference stroke parameter sets must be made to evaluate a potential match between a reference character and the character begin entered by the user. For example, when a stroke parameter set is received by the handwriting recognition algorithm, each reference parameter set of a dictionary entry must be compared with the stroke parameter set to determine the nearest stroke match between the input stroke and a reference stroke of a particular dictionary entry.

Returning again to FIGS. 9 and 10A, after input of first stoke 412, a corresponding stroke parameter set is calculated by the client and communicated to the handwriting recognition algorithm running on the server. In the absence of any knowledge of the stroke order, each reference parameter set in fields 713-717 of a record must be compared with the stroke parameter set to calculate a match probability with the character defined by the record and the character being input by the user. It is desirable to reduce the amount of requisite comparisons made between a stroke parameter set and reference parameter sets when interrogating a reference character dictionary.

In accordance with a preferred embodiment of the present invention, reference parameter sets of a record in reference character dictionary 700 have an associated reference sequence number. As referred to herein, a reference sequence number is the proper stroke number of a stroke sequence for writing a character according to an accepted stroke order rule. In accordance with a preferred embodiment of the present invention, a reference sequence number is associated with a reference parameter set by way of the particular field in which the reference parameter set is stored.

Reference parameter set fields 713-717 preferably contain reference parameter sets in order of the proper stroke sequence. For example, the reference character defined by record 723 consists of three strokes. According to established writing rules, the character defined by record 723 is properly written by first writing the upper horizontal stroke followed by the lower horizontal stroke. The character is completed by writing the vertical stroke. Accordingly, the reference parameter set describing attributes of the first stroke is stored in field 713 of record 723.

In the illustrative example, the reference parameter set describing the first reference stroke, that is the upper most horizontal stroke, of the reference character defined by record 723 consists of the length parameter L6, the angle parameter Θ6, and the center parameter C6 maintained in reference parameter field 713. Likewise, reference parameter set field 714 of record 723 consists of a reference parameter set defining attributes of the second stroke, or the bottom most horizontal stroke, of the reference character defined by record 723, and reference parameter set field 715 consists of the reference parameter set defining attributes of the final, or vertical, stroke of the reference character defined by record 723. In this manner, reference sequence numbers are intrinsically associated with reference parameter sets by the order in which the reference parameter sets are stored within a record.

In the illustrative example, reference parameter sets stored in reference parameter set fields 713-717 have corresponding reference sequence numbers of 1-5, respectively. Alternatively, a reference sequence number may be associated with a reference parameter set by other techniques, such as including a reference sequence number in the reference parameter set, cross linking a reference parameter set to a reference sequence number, or by way of another suitable mechanism.

In accordance with a preferred embodiment of the present invention, a user is able to provide an input at the client indicating the user's stroke order knowledge. This input is sent to a server. The server then reduces the number of comparisons made between a stroke parameter set and reference parameters sets of a dictionary record according to the stroke order knowledge indicated by the user. For example, in FIG. 4 selectable icon 430 provided in GUI 400 may allow the user to indicate a variable stroke order knowledge. In the illustrative example, icon 430 may be positioned at one of three positions corresponding to a maximum stroke order knowledge, an intermediate stroke order knowledge, and a minimum stroke order knowledge. For example, a user learning the Chinese language may not be familiar with various stroke order rules that dictate proper writing technique. Without any stroke order knowledge, the user is unable to correctly supply character strokes in the appropriate order. Thus, it is preferable that each reference parameter set of an indexed record is compared against the stroke parameter set when the minimum stroke order knowledge selection option of icon 430 is made.

Other users may write Chinese fluently and are able to indicate a high stroke order knowledge by selecting the maximum stroke order option of icon 430. The server then minimizes the number of comparisons made between a stroke parameter set and reference parameter sets of dictionary records by comparing a stroke parameter set only with reference parameter sets having a reference sequence number equal to the stroke sequence number of the stroke parameter set.

Other users may have some knowledge of stroke order rules dictating the order in which character strokes are to be written but may be uncertain of the precise stroke order. In accordance with another illustrative embodiment of the invention, a reduction in the amount of reference parameter sets that are compared with a stroke parameter set is achieved by comparing reference parameter sets with a reference sequence number that is within a predefined value of the stroke sequence number. For example, consider record 725 that defines a reference character consisting of five strokes. The reference parameter sets for the second through the fourth strokes of the reference character may be compared against a stroke parameter set having a stroke sequence number of three. A comparison of the stroke parameter set with the proper reference parameter set is still made if the stroke was input within one stroke of the proper sequence number.

Advantageously, comparisons of the stroke parameter set with the first and fifth reference parameters sets are excluded. As noted above, a typical Chinese character dictionary will have thousands of reference character entries and thousands of unnecessary comparisons between the stroke parameter set and reference parameter sets may be avoided.

Figure 12:
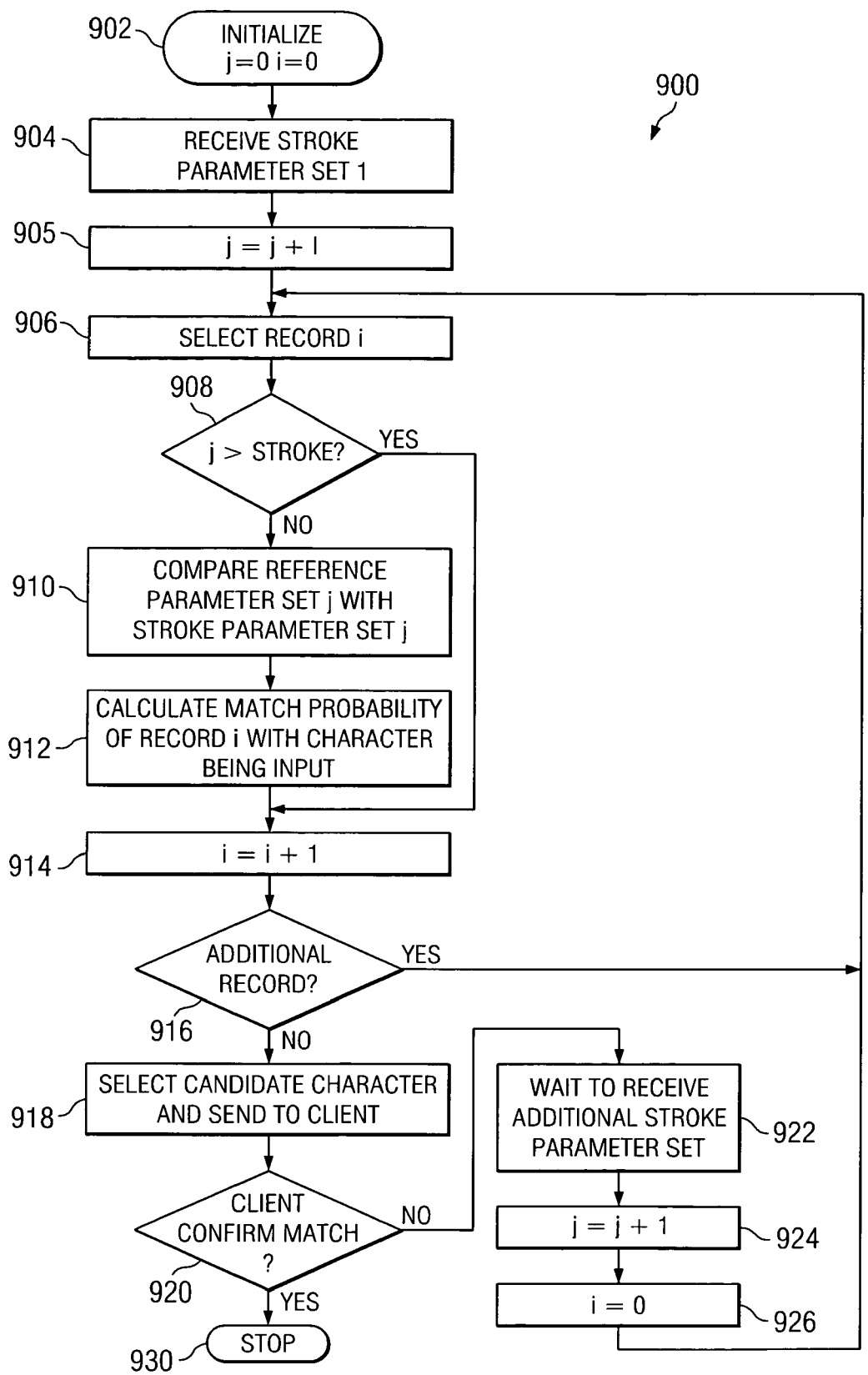
FIG. 12 is a flowchart of processing performed by the handwriting recognition algorithm for minimizing the number of comparisons performed during analysis of a stroke parameter set when the user has a maximum stroke order knowledge in accordance with a preferred embodiment of the present invention.

FIG. 12 is a flowchart 900 of processing performed by the handwriting recognition algorithm for minimizing the number of comparisons performed when the user has a maximum stroke order knowledge in accordance with a preferred embodiment of the invention. The handwriting recognition algorithm processing described in FIG. 12 is preferably performed by data processing system 200. It is preferred in the illustrative example that the handwriting recognition algorithm processing described with reference to FIG. 12 is invoked on selection of the maximum stroke order knowledge option provided by icon 430.

The handwriting recognition algorithm is initiated and a stroke sequence counter j and record index counter i are initialized to zero (step 902). The stroke sequence counter tracks the stroke sequence number of the stroke parameter sets received by the server. A first stroke parameter set of a character being input by the user is received by the handwriting recognition algorithm (step 904), and the stroke sequence counter j is incremented (step 905). The record index counter i is used for selecting a particular record of reference character dictionary 700 (step 906). For example, the record index counter may be used to cycle through each record of reference character dictionary 700 by selecting a record having a key field 710 value equal to the record index counter value.

The value of a data element in strokes field 712 is read and compared with stroke sequence counter j to determine whether counter j is greater than the number of strokes in strokes field 712 (step 908). If the stroke sequence counter value is greater than the number of strokes of the reference character defined by the indexed record i thereby indicating that a match between the reference character and the character being input by the user is not possible, the record index counter is incremented (step 914).

Alternatively, if counter j is not greater than the number of strokes, the reference parameter set j is compared with the stroke parameter set j (step 910), and a probability of a match between the reference character defined by the indexed record i and the character being input is calculated in response to the comparison (step 912). The record index counter is then incremented (step 914). An evaluation of whether an additional record remains to be evaluated for the current stroke parameter set j is made (step 916). The handwriting recognition algorithm proceeds back to step 906 to select the next reference character dictionary record i and cycles through the record comparison steps if an additional record remains to be evaluated.

Alternatively, if an additional record is not present, the handwriting recognition algorithm proceeds to select a candidate character and send the candidate character to the client when the final record of the reference character dictionary has been evaluated for a possible match with the current stroke parameter set j (step 918). As noted above, selection of a candidate character for communication to the client may include selecting a candidate character set having a plurality of candidate characters. An evaluation of whether a match confirmation is provided by the client is made (step 920). If a match confirmation is not received by the client, the handwriting recognition algorithm awaits receipt of an additional stroke parameter set (step 922) and increments the stroke sequence counter (step 924) on receipt of the stroke parameter set. The record index counter is reset to zero (step 926) and processing returns to select the first record of the reference character dictionary for evaluation of a possible match with the character being input by the user.

The handwriting recognition algorithm loops through the stroke reception and comparison steps until a confirmation of a match is received by the server. The handwriting recognition algorithm exits upon confirmation of a character match provided by the client (step 930).

Thus, a reference stroke parameter set having an associated reference sequence number that does not equal the stroke sequence number of a stroke parameter set being evaluated is eliminated from the comparison with the stroke parameter set in accordance with the described embodiment. That is, a stroke parameter set calculated from a jth stroke of a character being input by the user is only compared with reference parameter sets that define attributes of a jth stroke of reference characters defined in reference character dictionary 700. As a result, the number of comparisons made between a reference parameter set and a stroke parameter set is advantageously minimized. Preferably, the handwriting recognition algorithm processing described with reference to FIG. 12 may be interrupted at any time on receipt of a match confirmation communicated to the server by the client.

Figure 13:
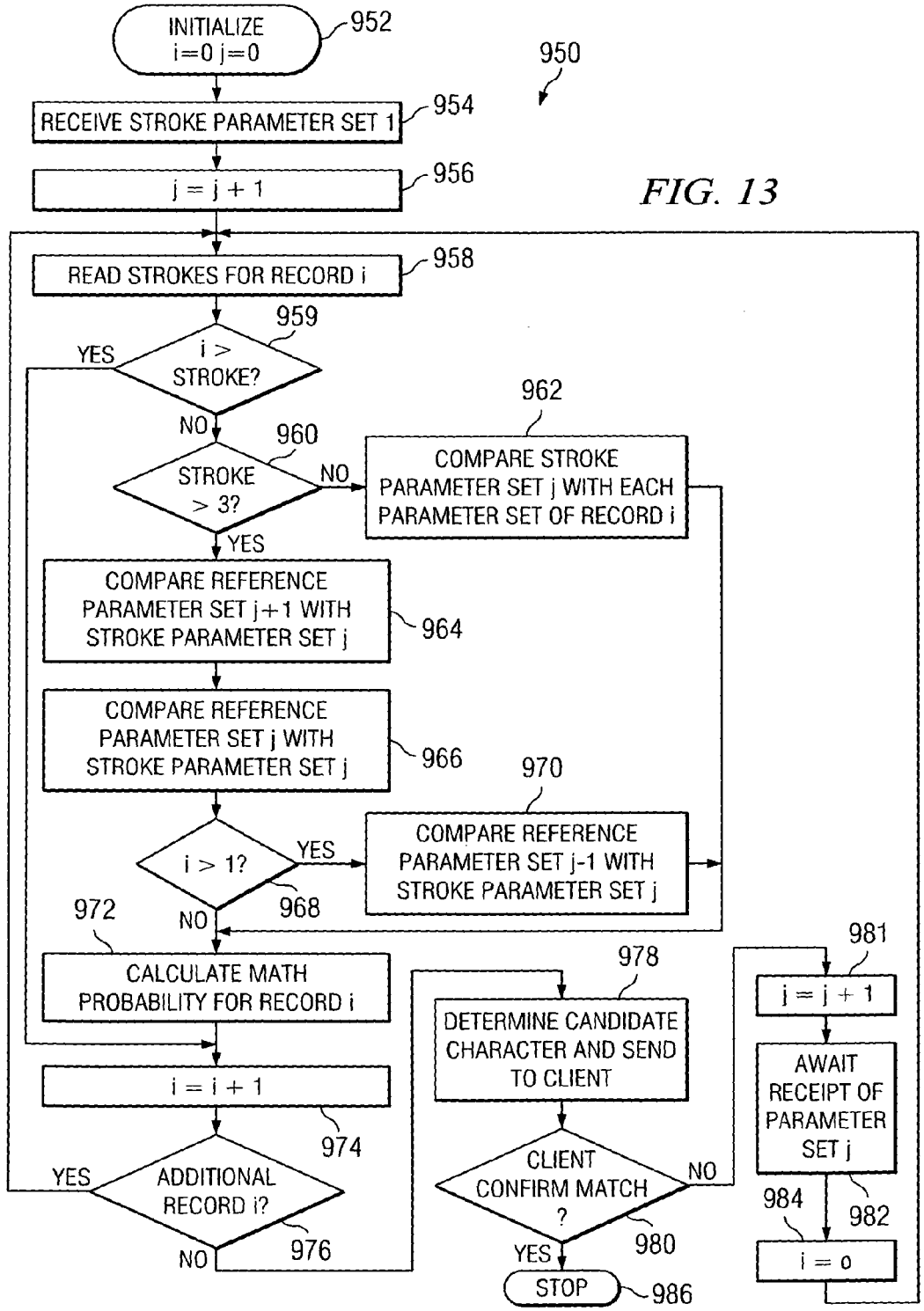
FIG. 13 is a flowchart of processing performed by the handwriting recognition algorithm for reducing the number of comparisons performed during analysis of a stroke parameter set when the user has an intermediate stroke order knowledge in accordance with a preferred embodiment of the invention.

FIG. 13 is a flowchart 950 of processing performed by the handwriting recognition algorithm for reducing the number of comparisons performed during analysis of a stroke parameter set when the user has an intermediate stroke order knowledge in accordance with a preferred embodiment of the invention. It is preferable that the handwriting recognition algorithm described in FIG. 13 is performed by data processing system 200. It is preferred that the handwriting recognition algorithm processing described with reference to FIG. 13 is invoked on selection of the intermediate stroke order knowledge option provided by icon 430.

The handwriting recognition algorithm is invoked and a record index counter i and stroke sequence counter j are initialized to zero (step 952). A first stroke parameter set is received (step 954), and the stroke sequence counter is incremented (step 956). The record indexed by the record index counter is selected and the number of strokes of the reference character defined in the indexed record i is read (step 958).

Then, an evaluation is made to determine if the stroke sequence number of the current stroke exceeds the number of constituent strokes of the reference character defined by the indexed dictionary record i (step 959). If the stroke sequence number exceeds the number of strokes of the indexed dictionary record, the handwriting recognition algorithm proceeds to increment the record index counter (step 974). Otherwise, an evaluation of whether the number of strokes of the indexed record is less than or equal to three is made (step 960).

If the number of strokes in the reference character of the indexed record is less than three, the handwriting recognition algorithm compares the current stroke parameter set j with each of the reference stroke parameter sets in record i (step 962). If the number of strokes of the reference character defined in the indexed record i is greater than three, the handwriting recognition algorithm compares the current stroke parameter set having a stroke sequence number j with a reference parameter set having a reference sequence number of j+1 (step 964). Additionally, the current stroke parameter set is compared with the reference stroke parameter set having a reference sequence number equal to the current stroke sequence number (step 966). The current stroke sequence number is then evaluated to determine if the current stroke parameter set being analyzed was derived from a first character stroke input by the user (step 968).

If the current stroke parameter set is the first stroke parameter set of the character being input, the handwriting recognition algorithm proceeds to calculate a match probability between the character being input and the reference character of the currently indexed record i (step 972). Alternatively, the handwriting recognition algorithm compares the stroke parameter set with the reference parameter set having a reference sequence number one less than the stroke sequence number (step 970).

The handwriting recognition algorithm then calculates a match probability of the character being input and the reference character of the currently indexed record i (step 972). The record index counter i is incremented (step 974) and an evaluation is made to determine whether an additional record remains for comparison with the current stroke parameter set (step 976). If an additional record remains, the handwriting recognition processing proceeds back to step 958 and selects the next record for evaluation. Otherwise, a candidate character, or set of candidate characters, is selected and transmitted to the client (step 978). An evaluation of whether a confirmation of a match between the character being input and one of the candidate characters has been provided by the client is made (step 980). The stroke sequence counter is incremented (step 981) and the handwriting recognition algorithm awaits receipt of the next stroke parameter set (step 982) if a match between any of the candidate characters is not confirmed by the client. The record index counter i is then re-initialized to zero (step 984) and the handwriting recognition algorithm returns to step 958 to select the first record for comparison with the newly received stroke parameter set. The handwriting recognition algorithm processing exits on receipt of a client confirmation of a match between one of the candidate characters and the character being input (step 986).

The current illustrative embodiment may better be understood with reference to reference character dictionary 700 shown in FIG. 9. Assume that the current stroke parameter set is calculated from the fourth stroke of a character being input by the user, that is the stroke sequence number j=4. Step 959 of the handwriting recognition algorithm processing in FIG. 13 evaluates the number of strokes of an indexed record to determine if the indexed record defines a reference character having fewer strokes than the number of strokes that have been input by the user. Reference parameter sets of a record defining a character having fewer strokes than the stroke sequence number are excluded from comparison with the stroke parameter set as the reference character cannot match the character being input by the user.

A preferred embodiment of the invention facilitates a reduction in the number of comparisons made between a stroke parameter set and reference parameter sets when the number of strokes of the reference character being compared with the stroke parameter set exceeds three strokes. For example, assume that the present stroke parameter set is the third stroke parameter set received by the server, that is j=3. Further assume that records 720-724 have already been evaluated and that the handwriting recognition algorithm has indexed record 725, that is i=5, for comparison with the current stroke parameter set.

In FIG. 13, step 960 results in a true evaluation and processing proceeds to step 964. Steps 964, 966, and 970 in FIG. 13 result in a "window" of reference parameter set comparisons being made with the current stroke parameter set j. For example, step 964 results in comparison of the reference parameter set maintained in field 716, that is the reference parameters of the fourth reference character stroke, against the current—the third in this instance—stroke parameter set. Step 966 results in comparison of the reference parameter set maintained in field 715, that is the reference parameter set of the third reference character stroke, with the current stroke parameter set. Step 970 results in comparison of the reference parameter set maintained in field 714, that is the reference parameter set of the second reference character stroke, with the current stroke parameter set.

Thus, the handwriting recognition algorithm processing compares the stroke parameter set calculated from the jth stroke input by the user with the jth reference character stroke parameter set and both adjacent reference parameter sets, that is the jth+1 and the jth−1 reference parameter sets. In the present example, the stroke parameter set of the third stroke input by the user is compared against each of the reference parameter sets of the second, third and fourth reference character strokes of record 725. Accordingly, the first and fifth reference parameter sets are excluded from comparison with the stroke parameter set, and the number of comparisons is reduced from five to three. In a system employing a typical reference character dictionary of Chinese characters, thousands of individual comparisons between the stroke parameter set and reference stroke parameter sets are advantageously excluded for each stroke input provided by the user.

While the above described embodiment utilizes a search window that compares the stroke parameter set with a reference parameter set having a reference sequence number equal to the stroke sequence number and reference parameter sets having respective reference sequence numbers within one of the stroke sequence number, other implementations are possible. For example, the handwriting recognition algorithm may determine a comparison window size, that is the number of reference stroke parameter sets to compare with the stroke parameter set, based on the number of strokes of the reference character defined in a particular indexed record. Alternatively, a larger or smaller pre-defined window size may be defined.

As described, the present invention provides a methodology and computer program product for reducing the number of comparisons made between a stroke parameter set and reference parameter sets of a reference character dictionary required for identifying a candidate character. The invention exploits stroke order rules that dictate the order in which character strokes are written. The sequence number of the order in which a character stoke is input is identified by a server running a handwriting recognition algorithm. Reference parameter sets defining attributes of character strokes have associated reference sequence numbers that identify the correct order in which the stroke is to be written. Reference parameter sets having a reference sequence number equal to the stroke sequence number are compared with the stroke parameter set. In other embodiments, reference parameter sets having a reference sequence number within a predefined value of the stroke sequence number are compared with the stroke parameter set.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing handwriting recognition for handwritten characters of a language having character stroke order rules, the method comprising the computer implemented steps of:

storing a plurality of respective reference parameter sets character in a reference character dictionary, wherein each of the plurality of respective reference parameter sets corresponds to a reference character stroke of a reference character, wherein each of the plurality of respective reference parameter sets has an associated reference sequence number;

receiving a stroke parameter set derived from user input of a handwritten stroke, wherein the handwritten stroke is one of a plurality of strokes required for writing a character;

identifying a stroke sequence number of the stroke parameter set;

responsive to identifying the stroke sequence number, comparing the stroke parameter set with at least those of the plurality of responsive reference parameter sets having their associated reference sequence number equal to the stroke sequence number, wherein the comparing excludes at least one of the plurality of respective reference parameter sets; and receiving an indication that a user has knowledge of the character stroke order rules.

2. The method according to claim 1, wherein the step of storing includes:

maintaining each of the plurality of respective reference parameter sets in a plurality of respective fields of a table, wherein the stroke sequence number is derived from one of the plurality of respective fields.

3. The method according to claim 1, wherein the step of identifying includes:

incrementing a counter value on receipt of the stroke parameter set, the counter value corresponding to the stroke sequence number.

4. The method according to claim 1, wherein the step of comparing further includes:

excluding each of the plurality of respective reference parameter sets, wherein the associated reference sequence number for each of the plurality of respective reference parameter sets excluded is not equal to the stroke sequence number.

5. The method according to claim 1, wherein the step of comparing further includes:

comparing with the stroke parameter set at least one of the plurality of respective reference parameter sets, wherein the associated reference sequence number is within one increment of the stroke sequence number.

6. The method according to claim 1, wherein the step of storing includes:

storing the respective reference parameter sets of a plurality of characters in the reference character dictionary.

7. The method according to claim 1, wherein each of the respective reference parameter sets of the plurality of characters is stored in one of a plurality of respective records of the reference character dictionary, and wherein each of the plurality of respective records includes a data element value equal to a number of constituent strokes of the reference character.

8. The method according to claim 1, further including:

excluding from the comparing step, at least one of the plurality of respective reference parameter sets of at least one of the plurality of respective records, wherein the data element value of the plurality of respective reference parameter sets excluded is less than the stroke sequence number.

* * * * *